(No Model.)
S. G. COWAN.
NUT LOCK.
No. 488,184. Patented Dec. 20, 1892.
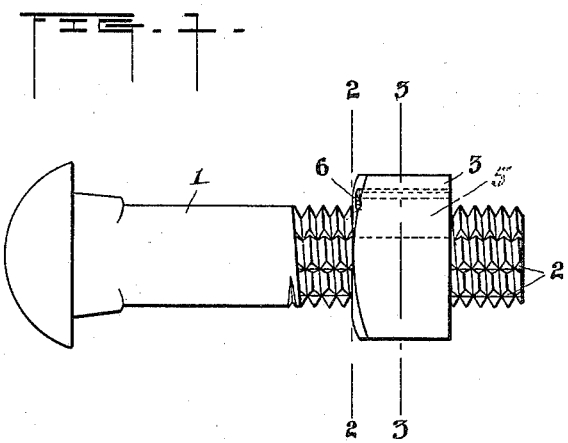
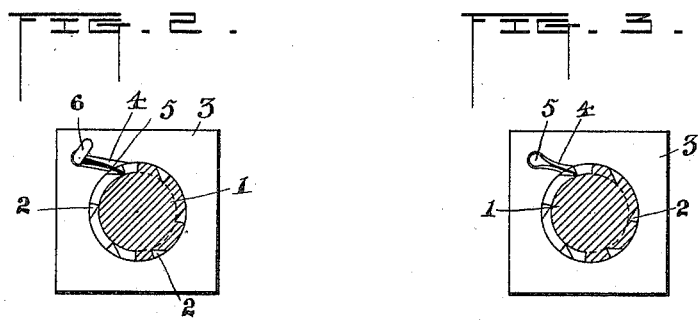
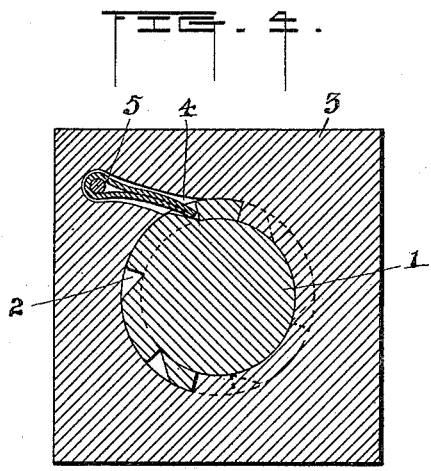
WITNESSES
INVENTOR
Stephen G. Cowan
by
Benj. R. Catlin atty

UNITED STATES PATENT OFFICE.

STEPHEN G. COWAN, OF RICHMOND, VIRGINIA.

NUT-LOCK.

SPECIFICATION forming part of Letters Patent No. 488,184, dated December 20, 1892.

Application filed June 25, 1891. Renewed May 21, 1892. Serial No. 433,795. (No model.)

*To all whom it may concern:*

Be it known that I, STEPHEN G. COWAN, a resident of Richmond, in the county of Henrico and State of Virginia, have invented certain new and useful Improvements in Nut-Locks; and I do hereby declare the following to be a full, clear, and exact description of the invention, such as will enable others skilled in the art to which it pertains to make and use the same.

The object of this invention is to provide a nut lock which shall be normally held within the nut, ready to lock the same whenever applied to a suitable bolt or screw, and which shall be certain in its action, secure from intermeddling and simple in construction.

In the accompanying drawings Figure 1, is a side elevation of a bolt and nut embodying the improvement; and Figs. 2 and 3 are sections on the lines 2—2, and 3—3 respectively of Fig. 1. Fig. 4 is an enlarged section on line 3—3, showing a particular form of spring.

Numeral 1 denotes a screw bolt having grooves 2, cut cross-wise of its threads. These grooves may be of any desired number. They by preference are formed with a steeper shoulder on one side than on the other. They will not ordinarily be cut any deeper than the screw threads, and strictly speaking will consist of a series of notches in the threads, arranged lengthwise of the screw, each of said notches having one side or wall more sloping than the other to permit the catch (to be described) to pass easily into the same, and so as to be arrested and held by the steeper wall. 3 indicates a nut adapted to be screwed upon the bolt. 4 indicates a recess formed in the body of the nut and opening into its interior and intersecting its threads. This recess, which can be formed by the same operation, by which the hole in the nut is punched, is made of suitable form to receive a spring 5 which may be of plate metal folded upon itself in substantially the manner indicated in Fig. 4; but other forms may be adopted. The forms of the spring and of the recess, preferably have such relation that when the former is in the recess, and in an operative position, and the nut is in place and bears against an object such as a fish bar, said spring cannot be withdrawn. The spring or catch may be so applied in the recess by driving or otherwise, that its removal without tools is impossible and so that it is practically impossible to remove it when the nut is screwed against an object, even by the aid of tools. It may, if desired, be provided with a head 6, which when arranged on the inside of the nut will be inaccessible, if the nut be screwed up against an object. If however, the nut be so applied to the bolt that the said head is on the outside and accessible, it furnishes means for withdrawing the spring. The latter mode of using the head is not however preferred, as it is a principal object of the invention to provide a lock which shall be permanently attached to the nut at the time of its manufacture or before its actual use and which will be secure against the curious or mischievous meddlers.

Ordinarily the key will be driven into the nut before it leaves the shop to avoid its accidental omission by careless railroad hand or by builder. If however it is intended for use on wagons or the like, it can be provided with a head as described, and may be kept in place by a jamb nut or cap, the arrangement providing for its removal when desired. In such case the position of the key can be reversed by reversing the key alone or the key and nut together. The head, if such is provided will be thereby made accessible in use.

It will be understood from the foregoing that the arrangemet of the spring or catch is such that it does not obstruct the screwing on of the nut, but such that it will strike the wall of a groove 2, whenever it is attempted to unscrew it, and effectually obstruct the operation. It is obvious that if sufficient power be applied in unscrewing the nut, the edge of the spring may be broken off or bent so as to destroy the lock, and particularly if the spring or catch be made of a soft metal.

Preferably the recess will be formed by sawing and will be simply a plain saw kerf and the spring catch will be a flat piece of steel which can be driven into the kerf. This piece can be made of about the same linear dimensions as the recess and a little thicker on one edge than the other, so that its back or thicker edge will fit tightly in the recess and its inner edge will have a small play transversely in the same. One end of such a catch or key can be made to extend slightly beyond the nut and be bent over to form a head or clinch.

It will be seen that the device though extremely simple and inexpensive is secure against removal by ordinary means, and that it can be used in any position without liability of removal by dropping, jarring, or otherwise.

I am aware that a spring-held pawl has been used in connection with transverse grooves on the bolt and also that a spring has been secured in a shallow recess within the nut, but such detents or springs, are too much exposed to meddlers and are also liable to be jarred out of place when used in some positions. Moreover such detents were not reversible and adapted to be inserted at either end of the nut in an operative position. It will be understood that a head may be formed on the spring either before it is inserted in the nut or afterward by upsetting, which head will render the removal of the spring impossible except it be broken as by a powerful wrench. The head however is not always essential since the spring will ordinarily be safely held by the friction of its thickened edge in its recess. The same spring can also be used upon wagons or in like situations with or without a head and can of course be protected by a cap or jamb nut if desired. No such protection is however required especially in the case the inner end of the nut abut against an object such as a fish plate which is the use for which the devise is primarily intended. The spring is of such form that a head can be formed on either end by upsetting, either before or after it is put into the nut. And further the form of the spring is such that it is reversible, that is it can be inserted in the nut in an operative position from either end of the nut. It is therefore capable of use under a variety of conditions. It is primarily intended to be used in connection with a nut having a face rounded as shown in Fig. 1, to adapt it to be turned snugly against a fish plate or like object. This rounding of the face is effected by rounding or depressing the corners and the head of the spring is made to lie in one of these corner depressions below the higher part of the face of the nut so that it does not interfere with the close fit which such rounding of the face is adapted to produce. The back edge of the spring may be transversely enlarged by a fold as shown in Figs. 2 and 4 and said fold can be made to inclose a wire having a head 6 or the spring may have an edge thickened by upsetting or in any convenient manner as indicated in Fig. 3 in which case the head can conveniently be made integral with the spring. The spring is made straight in the direction of the enlarged edge and this edge is of such thickness as to be adapted to be driven into the slot in the nut and snugly fit the same so as to be held with a moderate degree of security by friction alone. In some cases it is desirable that the spring be made removable, without reversing the nut and this is provided for by the straight, friction-held spring having a head which either precludes or facilitates the removal of the spring according to the modes of its use as above described. I am aware that a spring has been introduced into a shallow recess in a nut and the metal of the nut hammered down upon it and also that spurs have been provided on the nut which could be hammered down upon the spring and also that it has been proposed to secure a steel catch in such a recess by forcing the edge of the catch into the screw threads. Devices of such character are not of my invention.

Having thus described my invention, what I wish to secure by Letters Patent is:—

1. The screw threaded nut provided with a recess extending lengthwise through the same and communicating with its screw threaded hole, and a spring catch held in the recess by friction and extending into said hole, and adapted to be driven tightly into either end of the recess and provided with a head projecting out of the recess, substantially as set forth.

2. The screw threaded nut provided with a recess having parallel side walls extending lengthwise through the same, and communicating with its screw threaded hole, and a straight spring catch held in the recess by friction and extending into said hole, and adapted to be driven tightly into either end of the recess, in combination with a screw threaded bolt having grooves cut transversely of its screw threads, substantially as set forth.

In testimony whereof I have signed this specification in the presence of two subscribing witnesses.

STEPHEN G. COWAN.

Witnesses:
  O. H. LESTER,
  E. T. ECKLES.